(12) United States Patent
Kim et al.

(10) Patent No.: US 9,448,593 B2
(45) Date of Patent: Sep. 20, 2016

(54) ELECTRONIC DEVICE SOUND REPRODUCTION SYSTEM

(71) Applicant: Samsung Electronics Co., Ltd., Gyeonggi-do (KR)

(72) Inventors: Jeong-Hun Kim, Gyeonggi-do (KR); Mi-Hyang Kim, Gyeonggi-do (KR); Kwang-Weon Park, Gyeonggi-do (KR); Yo-Ywang Im, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/016,783

(22) Filed: Feb. 5, 2016

(65) Prior Publication Data

US 2016/0154437 A1    Jun. 2, 2016

Related U.S. Application Data

(63) Continuation of application No. 14/190,601, filed on Feb. 26, 2014, now Pat. No. 9,282,407.

(30) Foreign Application Priority Data

Feb. 27, 2013    (KR) .................. 10-2013-0021317

(51) Int. Cl.
   *G06F 1/16*    (2006.01)
   *H04R 1/02*    (2006.01)
   *G06F 3/041*   (2006.01)

(52) U.S. Cl.
   CPC ........... *G06F 1/1652* (2013.01); *G06F 1/1677* (2013.01); *G06F 1/1679* (2013.01); *G06F 1/1688* (2013.01); *G06F 3/041* (2013.01); *H04R 1/028* (2013.01); *G06F 2200/1637* (2013.01); *G06F 2203/04102* (2013.01); *H04R 2201/025* (2013.01); *H04R 2499/15* (2013.01)

(58) Field of Classification Search
   CPC ...... H04R 5/02; H04R 2499/15; H04R 5/04; H04R 3/12; H04R 2499/11; H04R 1/02; H04R 2420/07
   USPC .......................................................... 345/173
   See application file for complete search history.

(56) References Cited

U.S. PATENT DOCUMENTS

| | | | | |
|---|---|---|---|---|
| 6,438,249 | B1* | 8/2002 | Wiener | H04R 1/025 381/386 |
| 7,957,550 | B2* | 6/2011 | Jih-Fon | G06F 1/1626 381/332 |
| 8,379,888 | B2* | 2/2013 | Lee | H04R 17/005 381/116 |
| 8,385,586 | B2* | 2/2013 | Liou | H04R 19/00 381/191 |
| 8,503,702 | B2* | 8/2013 | Kao | H04R 19/013 181/157 |
| 8,625,824 | B2* | 1/2014 | Chen | H04R 19/01 381/191 |
| 8,784,189 | B2* | 7/2014 | Miller | A63F 1/02 463/16 |
| 8,824,723 | B2* | 9/2014 | Lin | H04R 3/00 381/396 |
| 8,861,755 | B2* | 10/2014 | Ando | H04R 17/005 381/190 |
| 2004/0189151 | A1 | 9/2004 | Athanas | |

* cited by examiner

*Primary Examiner* — Mark Blouin
(74) *Attorney, Agent, or Firm* — Cha & Reiter, LLC.

(57) ABSTRACT

A deformable electronic device comprises a housing deformable by a user, at least one deformable speaker and a processing unit for selecting a sound reproduction method using the at least one speaker in response to deformation of the electronic device.

20 Claims, 14 Drawing Sheets

ELECTRONIC DEVICE SOUND REPRODUCTION SYSTEM

CROSS REFERENCE TO RELATED APPLICATIONS

This is a Continuation application of U.S. patent application Ser. No. 14/190,601 filed on Feb. 26, 2014 which claims the benefit of priority under 35 U.S.C. §119(a) from a Korean patent application filed in the Korean Intellectual Property Office on Feb. 27, 2013 and assigned Serial No. 10-2013-0021317, the entire disclosure of which is hereby incorporated by reference.

BACKGROUND

1. Field of the Invention

The present invention relates to an electronic device having a flexible display.

2. Description of the Related Art

Flexible display devices are contemplated to replace conventional displays for different applications. For example, flexible display devices may be used in an electronic book or in an ultra miniature Personal Computer (PC) that may be carried by folding or rolling. A flexible display replacing a conventional display offers the advantage of being bendable, however an electronic device that employs a flexible display may not meet a desired level of reliability. Also, an electronic device that employs a flexible display may be bendable by a user but returns to its original un-deformed state when a user removes pressure from the electronic device and does not maintain a bent state, which exacerbates reliability impairment. A system addresses these deficiencies and related problems.

SUMMARY

A system comprises an electronic device that maintains deformation of a flexible display and detects deformation and a deformation type of a flexible display. The system in an embodiment uses a film speaker including a plurality of piezoelectric devices attached to a vibration film advantageously enabling the vibration film to be partitioned into independent vibration regions corresponding to the plurality of piezoelectric bodies, respectively and supporting selection of a sound reproduction method (e.g. monophonic or stereophonic) in response to deformation of the electronic device.

A deformable electronic device comprises a housing deformable by a user, at least one deformable speaker and a processing unit for selecting a sound reproduction method (e.g., monophonic and stereophonic reproduction) using the at least one speaker in response to deformation of the electronic device.

In a feature the deformation of the electronic device comprises one of, (a) bending of the electronic device in a first front direction and (b) bending of the electronic device in a second rear direction substantially opposite to the first direction.

A flexible display outputs an image derived from a video signal received from the processing unit and is disposed in the front of the electronic device and the speaker is disposed in the rear of the electronic device. A deformation maintenance system maintains the deformation of the electronic device and is disposed between the flexible display and the speaker and comprises at least one chain comprising a plurality of sequentially connected unit pieces. A connection portion between the unit pieces suppresses rotation between the unit pieces induced by a restoring force of the electronic device that results from a device deformation. In another embodiment, the connection portion between the unit pieces receives power from the processing unit, and has an electric system for suppressing rotation between the unit pieces induced by a restoring force of the electronic device that results from a device deformation.

In another feature, a connection portion between the unit pieces comprises a protrusion attached to a first unit piece and a plurality of recesses incorporated in a second unit piece and disposed at one or more predetermined rotation angles, The first unit piece and the second unit piece are axially connected, and when the first unit piece rotates, the protrusion of the first unit piece fits into one of the plurality of recesses of the second unit piece, and orientation of the first unit piece relative to the second unit piece is substantially maintained. Further, the speaker comprises a vibration film and one or more piezoelectric devices attached to the vibration film spaced from each other. The one or more piezoelectric devices vibrate in response to a received audio signal of a selected sound reproduction method. A vibration separation unit forms independent vibration regions (vibration partitions) for the plurality of piezoelectric devices, respectively, in the vibration film in response to deformation of the electronic device. In an embodiment, the vibration separation unit comprises an electric unit coated on the vibration film, receiving power from the processing unit to form independent vibration regions for the plurality of piezoelectric devices, respectively, in the vibration film.

In another feature, the vibration separation unit comprises at least one separation member for protruding and pressurizing the vibration film and forming independent vibration regions for the plurality of piezoelectric devices, respectively, in the vibration film. At least one sensor detects tension of at least one local portion of the electronic device and provides detected tension data. A switch device changes audio reproduction associated electrical signal paths when deformation of the electronic device occurs and the device identifies occurrence of deformation of the electronic device in response to change of the electrical signal paths by the switch.

In a further feature, a deformable electronic device comprises a flexible display which is disposed in front of the electronic device and is bendable. A film speaker unit is disposed in a rear side of the electronic device, and is associated with a frame, and which comprises a vibration film and left and right piezoelectric devices spaced apart and attached to the vibration film. The film speaker unit is bendable together with the flexible display. The frame is disposed between the flexible display and the film speaker unit, maintaining bending of the flexible display, and comprising a plurality of connected unit pieces. A separation member protrudes from the frame to pressurize the vibration film, and form independent vibration regions (partitions) for the plurality of piezoelectric devices in the vibration film in response to the flexible display, the frame, and the film speaker being bent to the rear side of the electronic device. A sensor measures information including, a bending direction and a size of the bending, and provides the measured information to a processing unit. A processing unit provides signals to the flexible display and the film speaker unit. The processing unit outputs a monophonic audio signal to the film speaker in response to a bending direction being towards a front side of the electronic device and outputs a stereophonic audio signal to the film speaker in response to the bending direction being towards the rear side of the electronic device and the bending size is equal to or greater than a predetermined threshold.

In yet another feature, a sound reproduction method usable by a deformable electronic device acquires information identifying occurrence of deformation of an electronic device. A sound reproduction method of the electronic device is selected from a plurality of different sound reproduction methods, in response to the information identifying occurrence of deformation. At least one speaker device of the electronic device is used for sound reproduction in response to the selected sound reproduction method and information. Also, a sound reproduction method is selected in response to activation of a particular application or a particular processing function.

Other aspects, advantages and salient features of the invention will become apparent to those skilled in the art from the following detailed description, which, taken in conjunction with the annexed drawings, discloses exemplary implementations.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
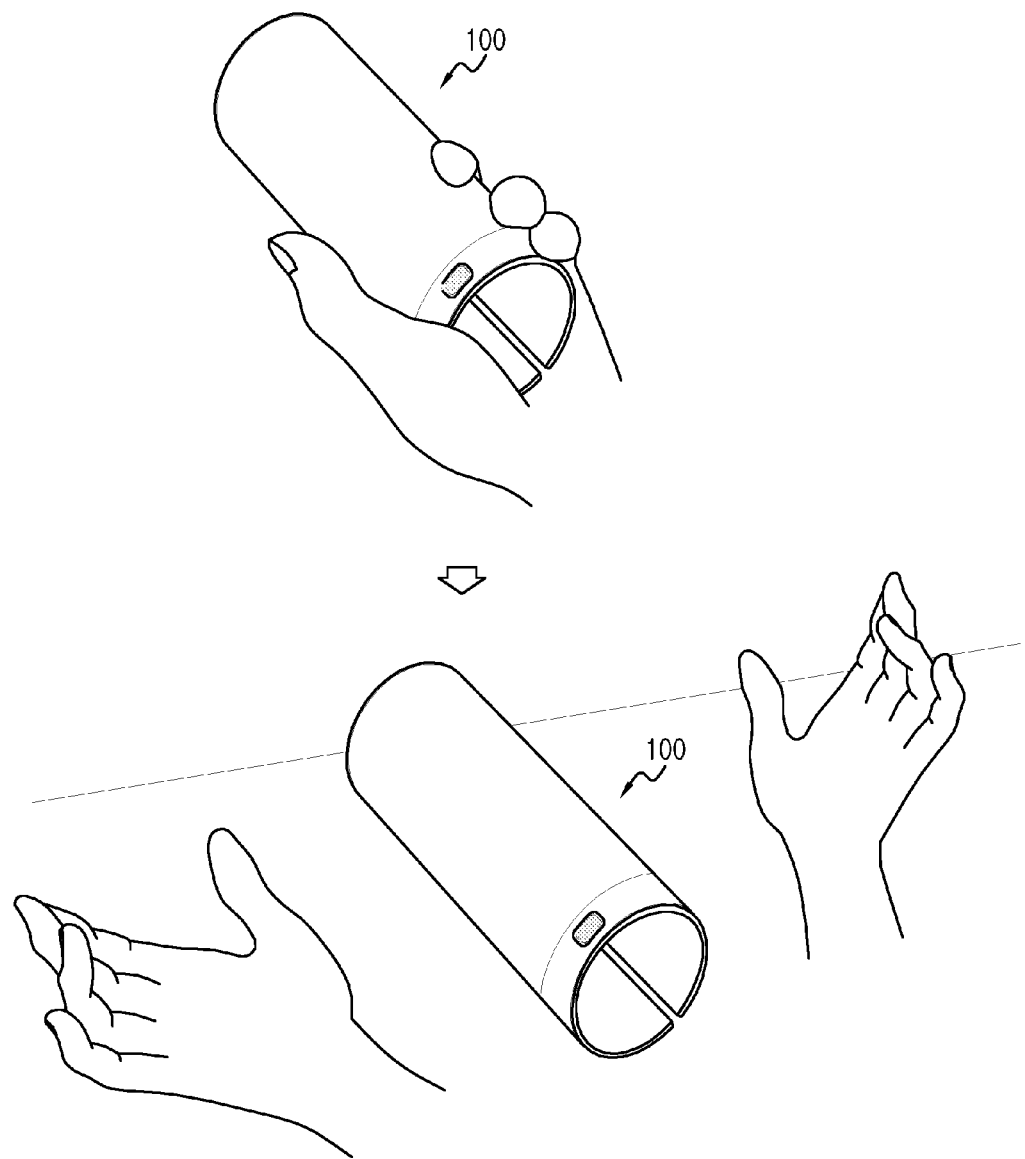
FIG. 1 illustrates a flexible electronic device according to invention principles.
Figure 2:
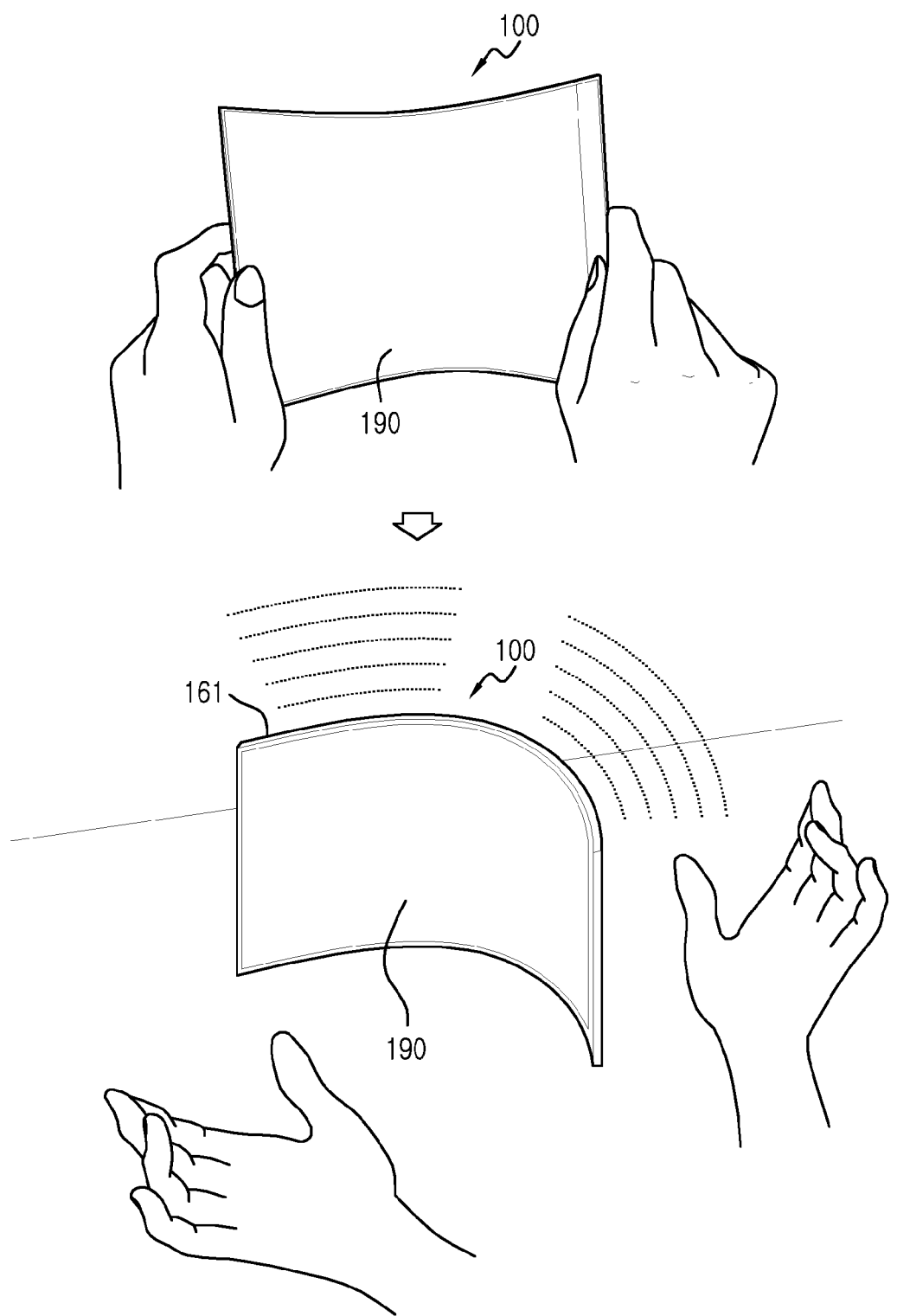
FIG. 2 illustrates a flexible electronic device according to invention principles.

An electronic device may be deformed by at least one of extension, shrinkage, warping, folding, twisting, bending, unfolding, for example, and device elements including a flexible display conform to such deformation. Further, the electronic device has a speaker subject to such deformation where a plurality of piezoelectric bodies (devices) are attached to a vibration film. FIGS. 1 and 2 illustrate a flexible electronic device. In FIG. 1, a user rolls the electronic device 100 and grips the electronic device with his hand, and places the rolled electronic device 100 on a surface but maintains the rolled shape.

In FIG. 2, the electronic device 100 reproduces music and a user grips both ends of device 100 to bend it and stand the bent electronic device 100 on a surface. The electronic device 100 maintains the deformation and identifies a bending direction and selects a sound reproduction method in response to the deformation. The selectable sound reproduction methods comprise mono and stereo reproduction methods, for example. A sound reproduction method designates at least one speaker and an associated an output path of an audio signal. The bending direction indicates a drooping direction of the flexible display 190 disposed in the front. A speaker 161 including a vibration film and a left piezoelectric body and a right piezoelectric body attached on both sides of the vibration film are provided to the rear side of the electronic device 100. If the electronic device is not bent, the electronic device 100 transfers the same mono signal to the left and right piezoelectric bodies, and the left and right piezoelectric bodies that receive the mono signal deform in response to the mono signal causing the vibration film to vibrate and generate sound. If the electronic device is bent rearward, a separation threshold member protrudes and contacts the vibration film providing separate vibration regions for the left and right piezoelectric bodies with one side of the vibration film providing vibration from the left piezoelectric body and the other side of the vibration film providing vibration from the right piezoelectric body supporting stereo sound reproduction. Therefore, if the electronic device body is bent to the rear, device 100 is able to transfer stereo signals to the left piezoelectric body and the right piezoelectric body, respectively, and generate different sounds via the vibration regions separated by the separation member. The electronic device 100 forms independent sound channels for the left and right piezoelectric bodies, respectively, supporting transfer of respective stereo signals to the independent sound channels.

Consequently, due to the bending of the electronic device 100, the speaker 161 is divided into two subspeakers, and these subspeakers generate different sounds, so that realistic music of a three-dimensional effect is advantageously provided to a user. The electronic device 100 may have multiple separation members that protrude and cause separation of vibration film regions depending on the shape of the deformed electronic device 100 assumes. The vibration region for the left piezoelectric body may change in size relative to the vibration region for the right piezoelectric body. Further, more than two piezoelectric bodies of the electronic device 100 may be provided with corresponding separation members and sound channels.

Figure 3:
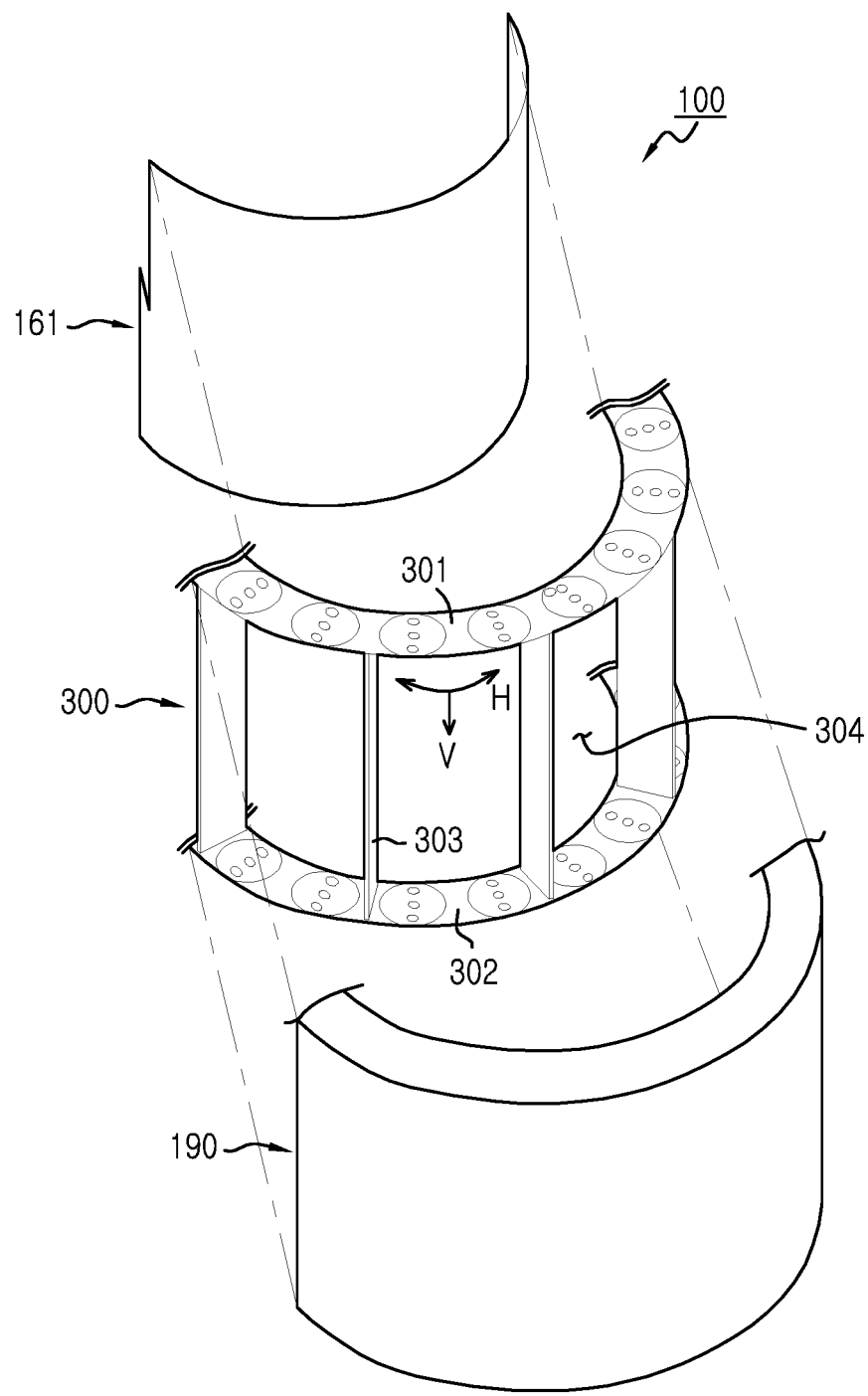
FIG. 3 further illustrates flexible electronic device parts according to invention principles.
Figure 4:
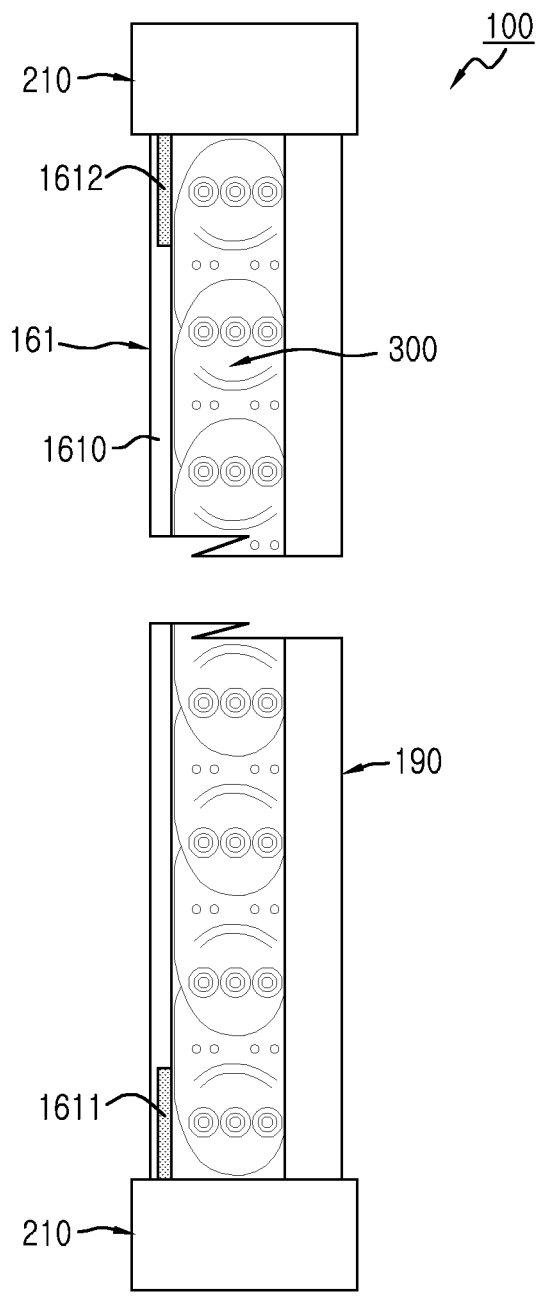
FIG. 4 is shows construction of an electronic device according to invention principles.

FIG. 3 shows flexible electronic device parts and FIG. 4 shows construction of an electronic device. The electronic device 100 includes a deformable housing, a flexible display 190, a chain 300, a film speaker 161, and a circuit board (not shown). The deformable flexible display 190 and is disposed in front of the electronic device 100, and displays an image in response to a signal from the circuit board (a processing unit). The flexible display 190 has elasticity and may restore to its original state after it is deformed. The chain 300 is interposed between the flexible display 190 and the film speaker 161 and may maintain deformation of the electronic device 100. The chain 300 includes an upper chain 301, a lower chain 302 coupled by shaft 303. The upper chain 301 and the lower chain 302 have hardness in the vertical direction (V) but have flexibility in the horizontal direction (H). The upper chain 301 and the lower chain 302 have a plurality of unit pieces, and the unit pieces are joint-connected. Friction exists in a connection portion between the unit pieces of the chain 300, and this frictional force may block restoration of the flexible display 190. A user may fold or unfold the unit pieces with force greater than this frictional force. A separation member is formed at the end of a first unit piece and protrusions of the first unit piece are attached to the end of a second unit piece using a plurality of formed recesses disposed at a predetermined rotation angles. If the first unit piece and the second unit piece are rotated with respect to each other, the first unit piece rotates around a connection shaft between unit pieces and passes protrusions of the second unit piece. A protrusion may be detached from the recess due to external force exceeding a predetermine magnitude. In this way, the chain 300 may maintain deformation of the flexible display 190 even though the flexible display 190 has restoring force. In another embodiment, the connection portion between unit pieces receives power from a circuit board, and employs electrical means for suppressing rotation between unit pieces by a restoring force of the flexible display.

In the case where the chain 300 is bent, the separation member protrudes and contacts a vibration film 1610 (FIG. 4) of the film speaker 161. The separation member forms respective independent substantially vibration regions for the corresponding plurality of piezoelectric bodies in the vibration film by physical contact with the film preventing vibration from one region being passed to an adjacent region. In another embodiment, an electronic coating on the vibration film receives power from the circuit board to form respective independent vibration regions for the plurality of piezoelectric bodies in the vibration film by electrically forming vibration isolated regions in the vibration film by electrically moving a member to have physical contact with the film preventing vibration from one region being passed to an adjacent region.

The film speaker 161 is disposed in the rear of the electronic device 100 and includes the vibration film 1610, a left piezoelectric body 1611 attached to the left of the vibration film 1610, and a right piezoelectric body 1612 attached to the right of the vibration film 1610. In an embodiment, the vibration film 1610 comprises a film formed of polyvinylidene fluoride, for example and the left and right piezoelectric bodies 1611 and 1612 are formed of rochelle salt, for example. The left and right piezoelectric bodies 1611 and 1612 are electrically connected with the circuit board of the electronic device 100 and receive a signal from the circuit board. The left and right piezoelectric bodies 1611 and 1612 vibrate in response to receiving a signal from the circuit board and in turn initiate vibration in vibration film 161 to generate sound. Particularly, in the case where the electronic device 100 is bent on the rear side, vibration regions of the left and right piezoelectric bodies 1611 and 1612 may be separated from the vibration film by the separation member protruding from the chain 300. The separation member enables one half of the vibration film 1610 to generate vibration for the left piezoelectric body and the other half of the vibration film 1610 to generate vibration for the right piezoelectric body. A plurality of piezoelectric bodies may be attached on the flexible display 190, and the flexible display 190 may be used as a diaphragm.

The circuit board determines operation of the electronic device 100 and maintains information, drives the electronic device 100, and allows data input/output of units of the electronic device 100. The circuit board transfers a signal to the flexible display 190 for display by unit 190 as an image. The circuit board also transfers a signal to the film speaker 161, and in response the film speaker 161 generates sound. Further, the circuit board is flexible and installed in a vacant space 304 of the chain 300 and may be attached to an injected frame 210 (FIG. 4) of the electronic device 100. In the case where the electronic device is not bent, the circuit board transfers the same mono signal to the left and right piezoelectric bodies 1611 and 1612 of the film speaker 161. The left and right piezoelectric bodies 1611 and 1612 vibrate and in response the vibration film vibrates to generate a sound. In contrast, in the case where the electronic device 100 is bent on the rear side, the separation member protrudes from the chain 300 and contacts the vibration film 1610 of the film speaker 161 providing vibration isolation of film regions. One half of the vibration film 1610 vibrates due to the left piezoelectric body 1611, and the other half of the vibration film 1610 vibrates due to the right piezoelectric body 1612.

In the case where the electronic device 100 is bent to the rear side, the electronic device 100 transfers corresponding stereo signals to the left piezoelectric body 1611 and the right piezoelectric body 1612, respectively, and each of the two sides of the vibration film 1610 generate different sounds. The electronic device 100 forms independent sound channels for the left and right piezoelectric bodies 1611 and 1612 in response to software control, respectively, and transfer corresponding stereo signals to independent sound channels of the left and right piezoelectric bodies 1611 and 1612, respectively. Consequently, due to bending of the electronic device 100, two subspeakers form three-dimensional sound from one speaker system 161.

The electronic device 100 uses at least one sensor for identifying device bending. The sensor is installed on at least one of, the flexible display 190, the chain frame 300, and the film speaker 161. For example, a tension sensor may be installed on at least one of, the flexible display 190, the vibration film 1610, and the chain 300 to provide measured tension data to the circuit board. Where the measured tension exceeds a threshold value, the circuit board switches the sound reproduction method from mono to stereo. Consequently, tension exceeding the threshold indicates respective vibration regions are provided for the left and right piezoelectric bodies 1611 and 1612 in the vibration film 1610. A switch device changes a connection state in response to physical deformation of electronic device 100 and the circuit board recognizes occurrence of deformation from a change in connection of the switch device installed in the separation member of the chain 300, for example. The electronic device 100 includes a sensor determining the shape of deformation of the electronic device 100. This sensor is installed in the flexible display 190, the chain 300 or film speaker 161, for example. The electronic device 100 detects the bending direction of the electronic device 100 from information provided from the sensor, and selects a mono or stereo sound reproduction method in response to the bending direction.

Figure 5:
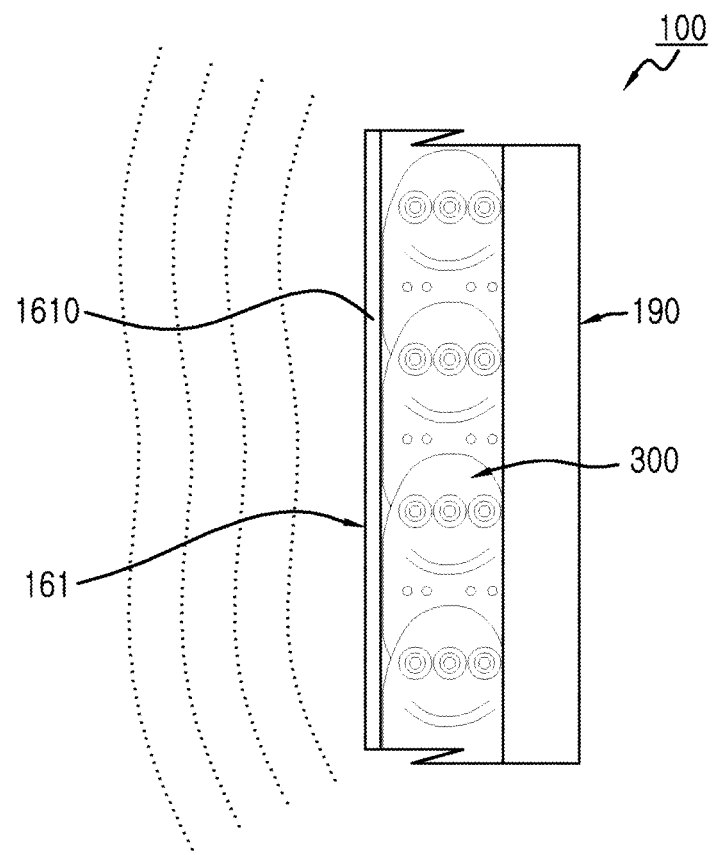
FIG. 5 shows an adaptive sound reproduction system varying in response to bending of an electronic device according to invention principles.
Figure 6:
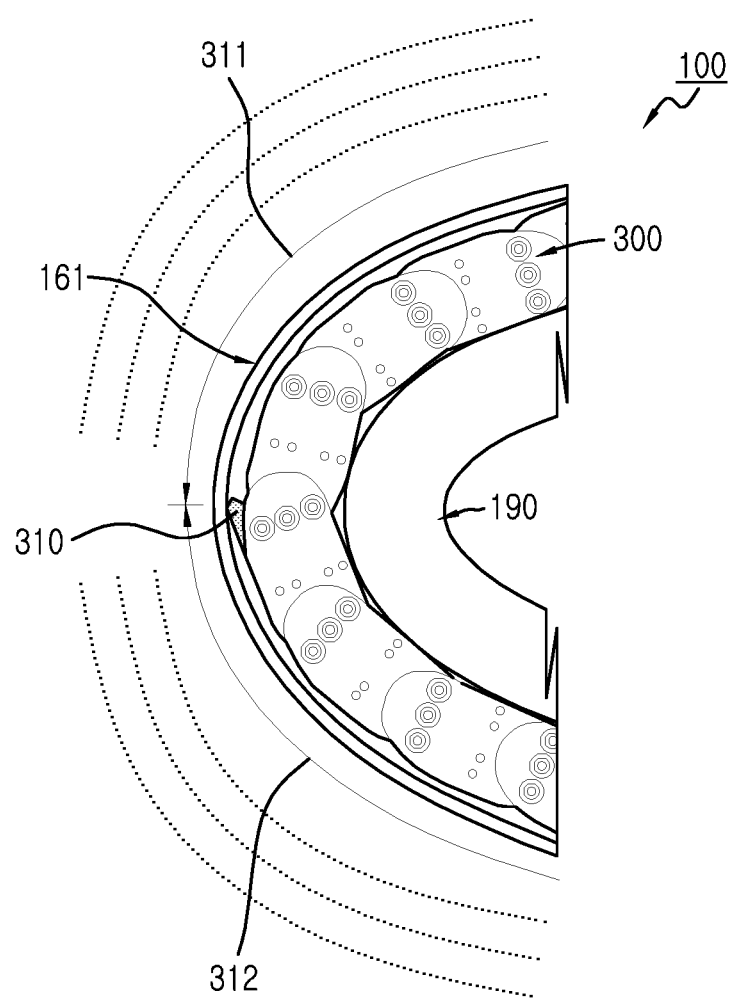
FIG. 6 shows an adaptive sound reproduction system varying in response to bending of an electronic device according to invention principles.

FIGS. 5 and 6 show an adaptive sound reproduction system varying in response to bending of an electronic device. The electronic device 100 outputs a mono signal via the left and right piezoelectric bodies 1611 and 1612 of the film speaker 161 disposed in the rear in response to no device 100 deformation. The left and right piezoelectric bodies 1611 and 1612 vibrate the vibration film 1610 in response to a mono signal. The electronic device 100 determines the bending direction of the electronic device 100 via at least one sensor in response to device 100 being bent to the rear, the electronic device 100 selects stereo sound reproduction. If device 100 is bent to the rear, the separation member 310 of the chain 300 protrudes and pressurizes the vibration film 1610 of the film speaker 161 and if the separation member pressurizes the vibration film 1610 with a pressure exceeding a predetermined magnitude, independent vibration regions for respective piezoelectric bodies 1611 and 1612 are formed in the vibration film 1610. This advantageously enables stereo sound reproduction by piezoelectric bodies 1611 and 1612. The larger the bending force applied to electronic device 100, the greater is the pressure applied by the separation member to the vibration film 1610, and the higher the tension experienced by vibration film 1610. A sensor of electronic device 100 determines the bending degree of the electronic device 100. For example, in an embodiment device 100 includes a tension sensor attached to the vibration film 1610 and determines the bending and the bending magnitude of device 100 from tension measured by the tension sensor. If the bending magnitude exceeds a predetermined threshold, the electronic device 100 forms independent sound channels for the left and right piezoelectric bodies 1611 and 1612, respectively, and transfers corresponding stereo signals to the left and right piezoelectric bodies 1611 and 1612, respectively, so that different sounds are generated at both sides of the vibration film 1610.

Figure 7:
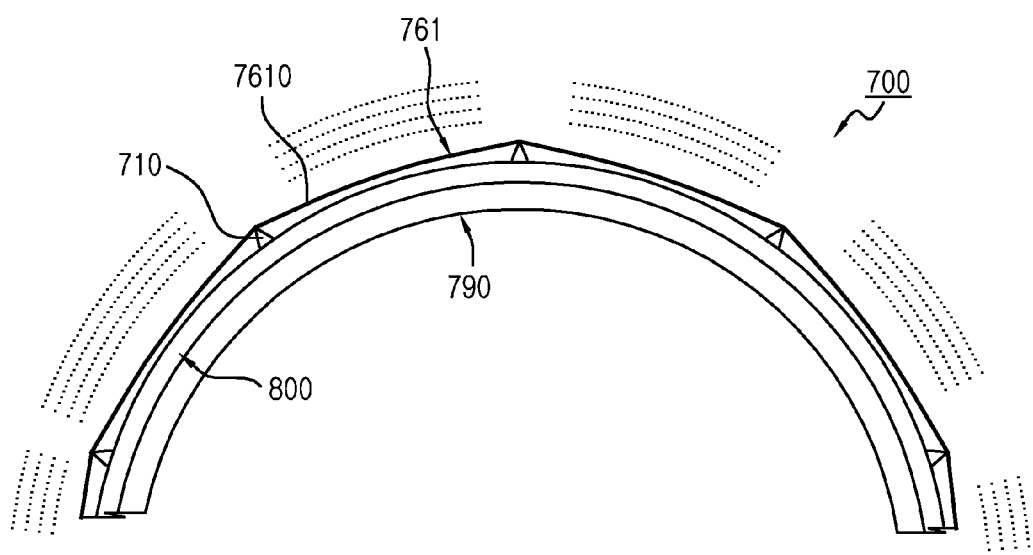
FIG. 7 shows construction of a flexible electronic device according to invention principles.

FIG. 7 shows construction of a flexible electronic device 700 comprising flexible display 790 disposed in front of a chain 800, and a speaker 761 disposed in the rear of the chain 800. The speaker 761 may have a vibration film 7610 and at least two or more piezoelectric bodies attached to the vibration film 7610. When the electronic device 700 is bent, vibration regions for respective piezoelectric bodies are formed in the vibration film 7610. For this purpose, the chain 800 may have a plurality of separation members 710 protruding to pressurize the vibration film 7610.

Figure 8:
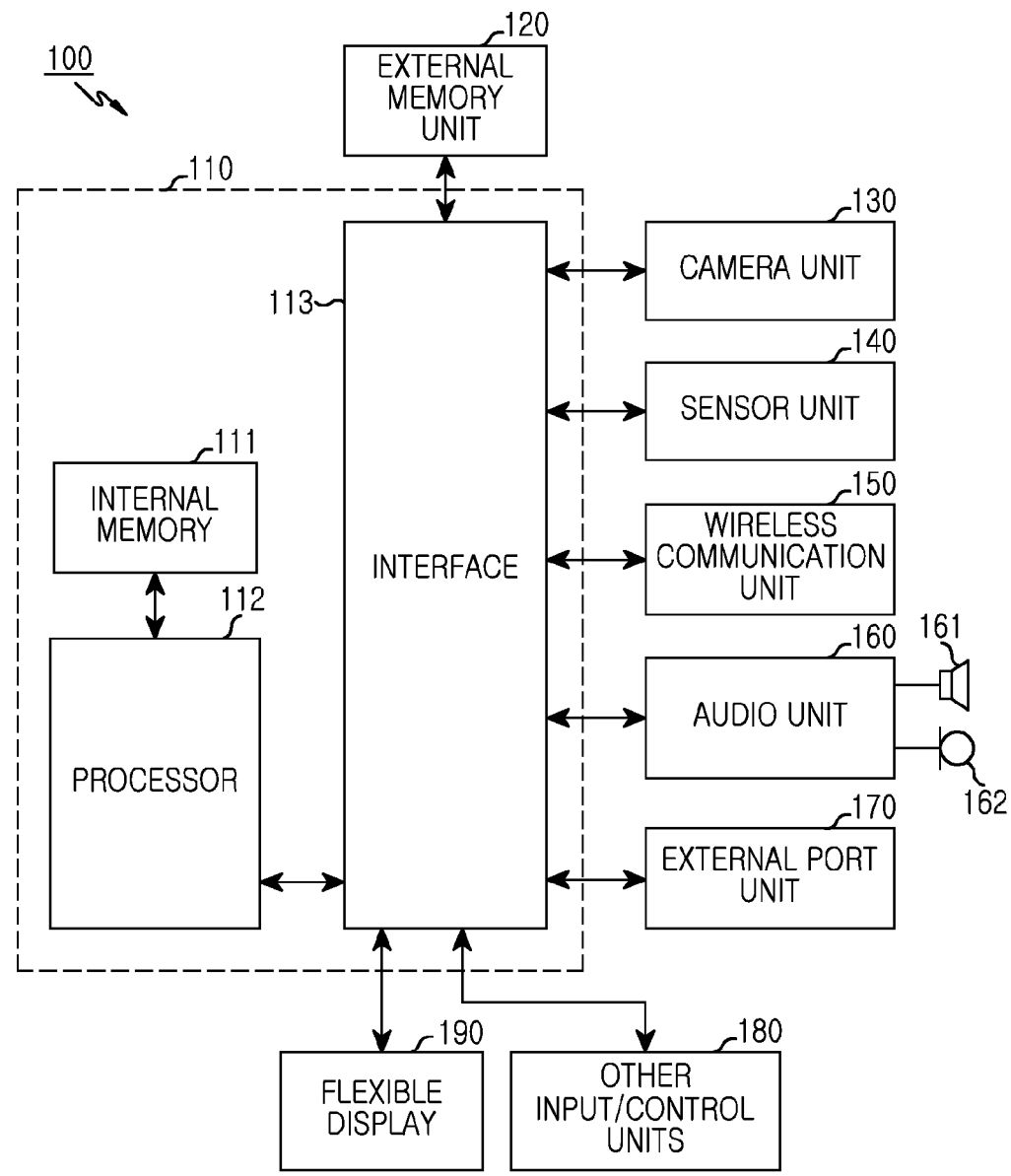
FIG. 8 shows a flexible electronic device system according to invention principles.

FIG. 8 shows a flexible electronic device system 100 such as a mobile phone, a mobile pad, a media player, a tablet computer, a handheld computer, a watch or a Personal Digital Assistant (PDA). Also, the electronic device 100 may combine two or more functions of these products. Device 100 includes a host unit 110, an external memory unit 120, a camera unit 130, a sensor unit 140, a wireless communication unit 150, an audio unit 160, an external port unit 170, a flexible display 190, and other input/control units 180. System 100 may include a plurality of external memory units 120 and external port units 170. The host unit 110 includes an internal memory 111, one or more processors 112, and an interface 113 comprising separate elements or one or more integrated circuits (IC).

The processor 112 executes different software programs to perform different functions for the electronic device 100, and controls voice communication, video communication, and data communication. In addition to these functions, the processor 112 executes a software module (instruction set) stored in the internal memory 111 and/or the external memory unit 120 to perform additional functions. The processor 112 employs software modules stored in the internal memory 111 and/or the external memory unit 120 and may include one or more data processors, image processors, or a CODEC. The interface 113 connects different units of the electronic device 100 with the host unit 110. The camera unit 130 executes camera functions including image acquisition, video clip recording and comprises a Charged Coupled Device (CCD) or a Complementary Metal Oxide Semiconductor (CMOS), for example. The camera unit 130 supports configurable hardware configurations, controls lens movement and an F number of an aperture in response to software executed by the processor 112. Various elements of the electronic device 100 are connected via one or more communication buses (reference numeral not shown) or stream lines (reference numeral not shown).

The sensor unit 140 includes at least one sensor detecting movement, light, temperature, tension and deformation, for example, and measures deformation information of the electronic device 100 and transfers the information to the host unit 100. The wireless communication unit 150 enables wireless communication and may include Radio Frequency (RF) transmitter/receiver, light (for example, infrared) transmitter/receiver. The wireless communication unit 150 may be designed to operate via one of a Global System for Mobile Communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network and/or a Bluetooth network.

The audio unit 160 is connected to a speaker 161 and a microphone 162 to take manage audio input and output including voice recognition, voice duplication, digital recording and a communication function, for example. The audio unit 160 communicates with a user via the speaker 161 and the microphone 162. The audio unit 160 receives a data signal from the host unit 110, converts the received data signal to an electric signal, and outputs the converted electric signal via the speaker 161. The speaker 161 converts an electric signal to an audio frequency band for output and includes a flexible film speaker disposed in the rear of the electronic device 100. The flexible film speaker includes at least one piezoelectric body attached to a vibration film. The microphone 162 converts a sound wave transferred from a person or other sound sources to an electric signal. The audio unit 160 receives an electrical signal from the microphone 162, converts a received electrical signal to an audio data signal, and transfers the converted audio data signal to the host unit 110. The audio unit 160 includes an earphone, a headphone, or a headset attachable to, and detachable from, the electronic device 100.

The external port unit 170 directly connects the electronic device 100 with other electronic devices, or indirectly connects the electronic device 100 with other electronic devices via a network (for example, the Internet, an intranet, a wireless LAN, etc.). The external port unit 170 includes a terminal disposed in the rear of the electronic device 100. The flexible display 190 includes a touch screen and presents text derived from a signal transferred from the host unit 11, and an image comprising graphics, video, for example. The other input/control units 180 includes an up/down button for volume control and at least one of a push button, a locking button, a locking switch, a thumb-wheel, a dial, a stick, and a pointer device such as a stylus.

The external memory unit 120 includes a high speed random access memory such as a magnetic disc storage device and/or a non-volatile memory, one or more optical storage devices and/or a flash memory (for example, NAND, NOR). The external memory unit 120 stores software. The software includes an Operating System (OS) module, a communication module, a graphic module, a user interface module, a CODEC module, and one or more applications. A module comprises a set of instructions or an instruction set or a program.

The OS module comprises WINDOWS, LINUX, Darwin, RTXC, UNIX, OS X, or a built-in OS such as VxWorks, and includes various software elements for controlling a general system operation. Control of the system operation includes memory management, storage hardware (device) management and power management, for example. The OS program communicates with different hardware units (devices) and software elements (modules). The communication module enables communication with a computer, a server, and a counterpart electronic device via the wireless communication unit 150 or the external port unit 170. The graphics module includes different software elements for providing and displaying graphics on the touchscreen unit 180. Graphics comprise text, a web page, an icon, a digital image, a video, and animation, for example. The user interface module includes different software elements and records state of user interface changes and associated conditions. The CODEC module include a software element related to encoding and decoding of a video file. The application module includes a browser, an e-mail, an instant message, word processing, keyboard emulation, an address book, a touch list, a widget, Digital Right Management (DRM), voice recognition, voice duplication, a position determining function, a location based service, for example. The memory 111 further include an additional module (instructions) besides the above-described modules. The different functions of the electronic device 100 are executed by processing one or more digital data streams using hardware including an Application Specific Integrated Circuit (ASIC) and/or software and/or a combination of these.

Figure 9:
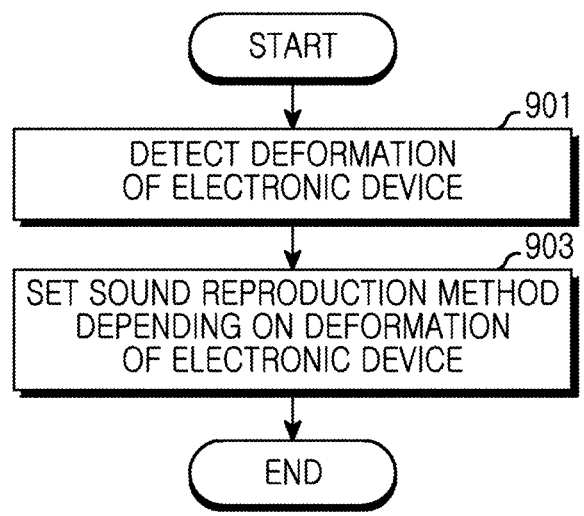
FIG. 9 shows a flowchart of a sound reproduction method employed by a flexible electronic device system according to invention principles.

FIG. 9 shows a flowchart of a sound reproduction method employed by a flexible electronic device system. Processor 112 detects deformation of the electronic device 100 in step 901. In step 903, the processor 112 selects a sound reproduction method depending on deformation of the electronic device. The processor 112 determines the shape of deformation, the magnitude of deformation, the direction of deformation, for example, from deformation information of the electronic device 100 via the sensor unit 140, and in response selects the sound reproduction method.

Figure 10:
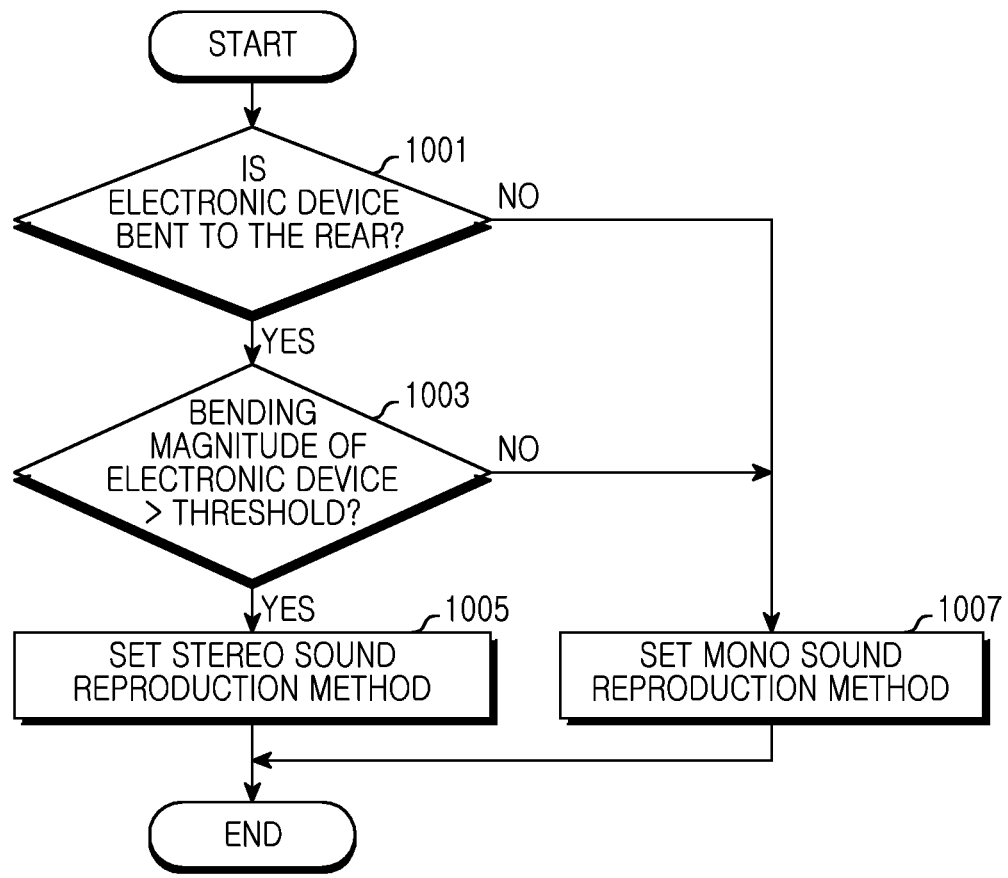
FIG. 10 shows a flowchart of a further sound reproduction method employed by a flexible electronic device system according to invention principles.

FIG. 10 shows a flowchart of a further sound reproduction method employed by a flexible electronic device system. In step 1001, the processor 112 identifies whether the electronic device 100 is bent to the rear. As previously described, the film speaker 161 is disposed in the rear of the electronic device 100 and includes the vibration film 1610 and the left piezoelectric body 1611 and the right piezoelectric body 1612 attached to the vibration film 1610 and disposed on both ends of the electronic device 100. If the electronic device 100 is not bent to the rear, the processor 112 selects a mono sound reproduction method in step 1007. The processor 112 forms one sound channel and transfers the same mono signal to the left piezoelectric body 1611 and the right piezoelectric body 1612 via this sound channel.

In the case where the electronic device 100 is bent to the rear, the processor 112 identify whether the bending degree of the electronic device 100 exceeds a threshold in step 1003. In the case where the bending degree of the electronic device 100 does not exceed the threshold, the processor 112 set the above-described mono sound reproduction method in step 1007. If the bending degree of the electronic device 100 exceeds a predetermined threshold, the processor 112 selects a stereo sound reproduction method in step 1005. If the bending degree of the electronic device 100 exceeds the threshold, the vibration film 1610 is divided into two vibration regions using separation member 310 protruding from the chain 300. The processor 112 forms a sound channel corresponding to the left piezoelectric body 1611 and a sound channel corresponding to the right piezoelectric body 1612 in response to software and transfers stereo signals via independent sound channels, respectively. The left piezoelectric body 1611 and the right piezoelectric body 1612 vibrate in response to corresponding stereo signals, and one half of the vibration film 1610 and the other half of the vibration film 1610 vibrate independently. Consequently, due to the bending of the electronic device 100, two subspeakers are formed from one speaker 161, and these subspeakers generate different sounds, so that realistic three-dimensional music is provided to a user.

Figure 11:
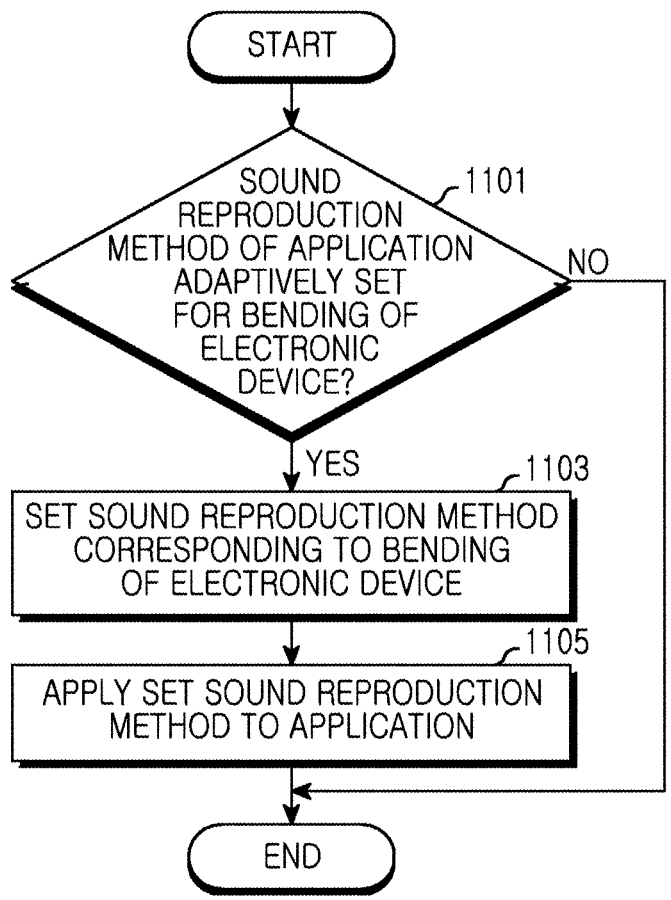
FIG. 11 shows a flowchart of another sound reproduction method employed by a flexible electronic device system according to invention principles.

FIG. 11 shows a flowchart of another sound reproduction method employed by a flexible electronic device system. In step 1101, the processor 112 identifies whether a sound reproduction method of an application has been adaptively selected in response to detected bending of the electronic device 100. If sound reproduction is not adaptively selected, the processor 112 terminates the algorithm. For example, the sound reproduction method of the application takes priority over a user configuration setting, and a sound reproduction method is selected in response to bending of the electronic device 100 and does not override an application selection. Processor 112 employs one of, a method of automatically setting a sound reproduction method of an application in response to the bending of the electronic device 100 and a method of manually selecting a sound reproduction method of an application in response to user configuration. In contrast, in the case where the sound reproduction method of the application is adaptively selected for the bending of the electronic device 100, the processor 112 selects the sound reproduction method in response to the bending of the electronic device 100 in step 1103. For example, the processor 112 selects the sound reproduction method using the method of FIG. 10. In step 1105, the processor 112 applies the selected sound reproduction method to an application and, the application outputs sound via the selected sound reproduction method.

Figure 12:
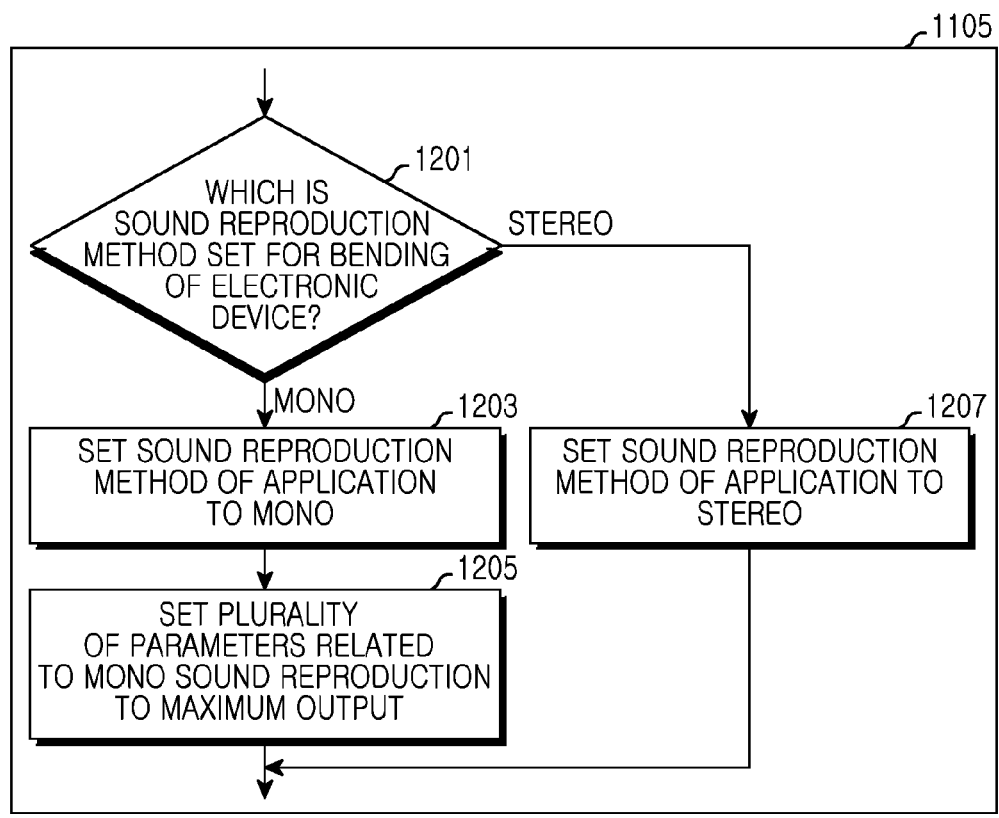
FIG. 12 shows a flowchart of a sound reproduction configuration method with concurrent music reproduction according to invention principles.

FIG. 12 shows a flowchart of a sound reproduction configuration method with concurrent music reproduction via an application as described in connection with step 1105 of FIG. 11. In step 1201, the processor 112 identifies a sound reproduction method selected in response to the bending of device 100. Processor 112 selects a stereo sound reproduction method based on bending of the electronic device 100 in step 1207 and selects a mono sound reproduction method based on bending of the electronic device 100 in step 1203. In step 1025, the processor 112 controls a plurality of parameters related to mono sound reproduction including volume.

Figure 13:
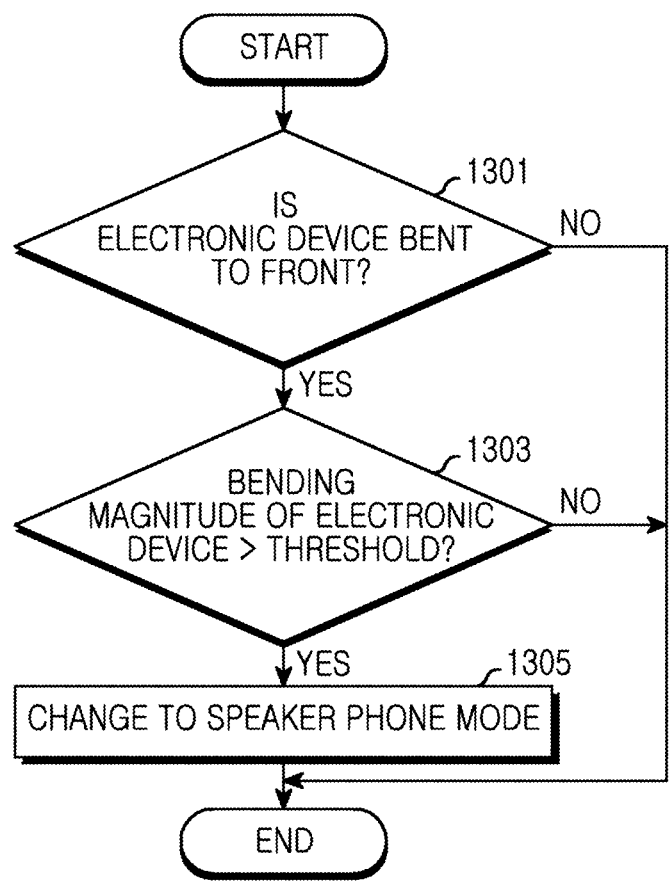
FIG. 13 shows a flowchart of a method for determining a speaker phone mode during communication according to invention principles.

FIG. 13 shows a flowchart of a method for determining a speaker phone mode during communication. In step 1301, the processor 112 identifies whether the electronic device 100 has been bent to the front during communication and if it has not been bent to the front, the processor 112 does not change a speaker phone mode. In contrast, if the electronic device 100 has been bent to the front, the processor 112, in step 1303, identifies whether the bending magnitude of the electronic device exceeds a threshold. Further, if the bending magnitude of the electronic device does not exceed the threshold, the processor 112 does not change speaker phone mode. If the bending magnitude of the electronic device exceeds the threshold, the processor 112 changes speaker phone mode in step 1305.

Figure 14:
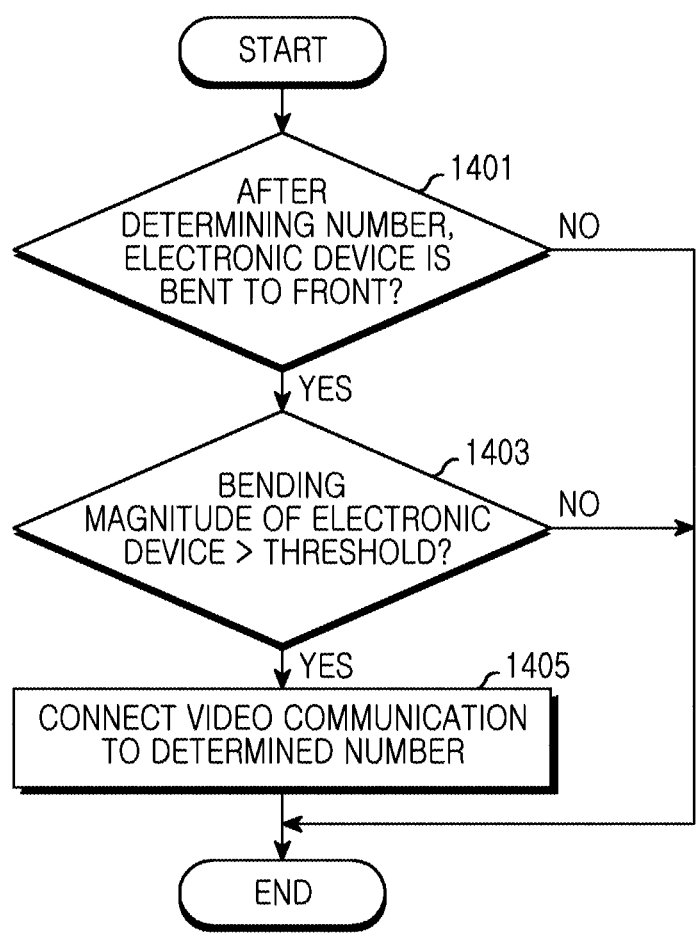
FIG. 14 shows a flowchart of a video communication method according to invention principles.

FIG. 14 shows a flowchart of a video communication method. In step 1401, the processor 114 identifies whether the electronic device 100 has been bent to the front after determining a number used for establishing communication (e.g. a phone number, IP address). If device 100 has not been bent to the front, the processor 112 does not establish video communication using the determined number. If device 100 has been bent to the front, the processor 112 in step 1403, identifies whether the bending magnitude of the electronic device exceeds a threshold and if not processor 112 does not establish video communication using the determined number. If the bending magnitude of the electronic device exceeds the threshold, the processor establishes video communication using the determined number in step 1405.

The methods according to the embodiments described in claims and/or the specifications of the present invention is implemented in the form of a hardware, a software, or a combination of the hardware and the software.

In case of implementation in a software, a computer readable storage medium that stores one or more programs (software module) is provided. One or more programs stored in the computer readable storage medium are configured for execution by one or more processors inside an electronic device. One or more programs include instructions for allowing the electronic device to execute methods according to the embodiments described in claims and/or specification of the present invention.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

The program (software module, and software) is stored in a random access memory, a non-volatile memory including a flash memory, Read Only Memory (ROM), Electrically Erasable Programmable Read Only Memory (EEPROM), a magnetic disc storage device, Compact Disc-ROM (CD-ROM), Digital Versatile Discs (DVDs) or other types of optical storage device, and a magnetic cassette, for example. Alternatively, the program is stored in a memory configured by a combination of all or a portion of these. Also, a plurality of memories is provided.

Although the invention has been shown and described with reference to certain exemplary embodiments thereof, it will be understood by those skilled in the art that different changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

An electronic device according to invention principles includes a flexible display disposed in the front and a film speaker disposed in the rear. Since the electronic device is bendable to the front or rear and maintains this bending, usability is advantageously improved. In the case where electronic device is bent, the electronic device switches a sound reproduction mode via the film speaker, so that bending induced deterioration in sound quality is advantageously reduced.

What is claimed is:

1. An apparatus comprising:
    an output device;
    a touchscreen capable of deforming, the touchscreen forming at least one portion of an outer surface of the apparatus; and
    a processor adapted to:
        detect that a deformation occurs with respect to at least one portion of the apparatus;
        output a sound via the output device using a first sound reproduction method based at least in part on a determination that the deformation satisfies a first condition; and
        output the sound via the output device using a second sound reproduction method based at least in part on a determination that the deformation satisfies a second condition.

2. The apparatus of claim 1, wherein the first method comprises a monophonic reproduction method, and the second method comprises a stereophonic reproduction method.

3. The apparatus of claim 1, further comprising:
    a supporting unit adapted to hold a shape of the apparatus against a restoring force associated with the deformation.

4. The apparatus of claim 3, wherein the processor is adapted to:
   control a power supply to at least one of the plurality of supporting units.

5. The apparatus of claim 3, wherein the supporting unit comprises a protruding portion adapted to touch the output device and to divide the output device to a first portion and a second portion if the deformation satisfies a corresponding one of the first condition and the second condition.

6. The apparatus of claim 5, wherein the sound comprises a first channel sound and a second channel sound, and wherein the processor is adapted to:
   output the first channel sound via the first portion; and
   output the second channel sound via the second portion.

7. The apparatus of claim 1, wherein the processor is adapted to:
   present, using the touchscreen, information associated with the deformation.

8. The apparatus of claim 1, further comprising at least one sensor, and wherein the processor is adapted to:
   identify a direction of the deformation or an amount of the deformation using the at least one sensor.

9. The apparatus of claim 8, wherein the at least one sensor comprises a bending sensor, or a tension sensor.

10. The apparatus of claim 1, wherein the processor is adapted to:
   identify an application being executed; and
   execute at least one function associated with the application based at least in part on a determination that the deformation satisfies corresponding one of the first condition and the second condition.

11. The apparatus of claim 1, further comprising a housing capable of deforming, the housing enclosing at least part of the output device or the touchscreen.

12. An apparatus comprises:
   a speaker capable of deforming;
   a touchscreen capable of deforming, the touchscreen forming at least one portion of an outer surface of the apparatus; and
   a supporting unit adapted to maintain the apparatus at a plurality of deformed positions.

13. The apparatus of claim 12, wherein the supporting unit comprises a plurality of unit pieces sequentially connected to one another.

14. The apparatus of claim 12, further comprising a processor adapted to:
   detect that a deformation occurs with respect to at least one portion of the apparatus;
   output a sound via the speaker using a first sound reproduction method based at least in part on a determination that the deformation satisfies a first condition; and
   output the sound via the speaker using a second sound reproduction method based at least in part on a determination that the deformation satisfies a second condition.

15. The apparatus of claim 14, wherein the supporting unit comprises:
   a protruding portion adapted to touch the speaker and to divide the speaker to a first portion and a second portion if the deformation satisfies a corresponding one of the first condition and the second condition.

16. The apparatus of claim 15, wherein the sound comprises a first channel sound and a second channel sound, and wherein the processor is adapted to:
   output the first channel sound via the first portion; and
   output the second channel sound via the second portion.

17. The apparatus of claim 14, further comprising at least one sensor, and wherein the processor is adapted to:
   identify a direction of the deformation or an amount of the deformation using the at least one sensor.

18. An apparatus comprising:
   a sensor;
   a speaker;
   a touchscreen capable of deforming; and
   a processor adapted to:
      detect a deformation of the touchscreen using the sensor;
      select a sound reproduction method from a plurality of sound reproduction methods based at least in part on the deformation; and
      present a sound via an output device using the selected sound reproduction method.

19. The apparatus of claim 18, wherein the speaker is deformable by a user corresponding to the apparatus.

20. The method of claim 18, wherein the sound reproduction method comprises:
   stereophonic sound reproduction method and monophonic sound reproduction method.

* * * * *